United States Patent
Hasegawa et al.

(10) Patent No.: US 6,810,855 B2
(45) Date of Patent: Nov. 2, 2004

(54) 4-STROKE ENGINE CONTROL DEVICE AND CONTROL METHOD

(75) Inventors: Hiroshi Hasegawa, Shizuoka-ken (JP); Yuichiro Sawada, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 10/471,516

(22) PCT Filed: Jul. 12, 2002

(86) PCT No.: PCT/JP02/07122

§ 371 (c)(1),
(2), (4) Date: Apr. 5, 2004

(87) PCT Pub. No.: WO03/006808

PCT Pub. Date: Jan. 23, 2003

(65) Prior Publication Data

US 2004/0149268 A1 Aug. 5, 2004

(30) Foreign Application Priority Data

Jul. 12, 2001 (JP) ........................... 2001-212337

(51) Int. Cl.[7] ................................................. F02M 41/00
(52) U.S. Cl. ........................................ 123/445; 123/472
(58) Field of Search ............................... 123/311, 434, 123/445, 184.1, 495, 472

(56) References Cited

U.S. PATENT DOCUMENTS 5,546,911 A * 8/1996 Iwamoto et al. ............ 123/497

FOREIGN PATENT DOCUMENTS

| JP | 47-42407   | 10/1972 |
|----|------------|---------|
| JP | 60-098329  | 6/1985  |
| JP | 63-080028  | 4/1988  |
| JP | 02-033433  | 2/1990  |
| JP | 08-326581  | 12/1996 |
| JP | 09-250378  | 9/1997  |
| JP | 10-227252  | 8/1998  |

* cited by examiner

Primary Examiner—Bibhu Mohanty
(74) Attorney, Agent, or Firm—Hogan & Hartson, LLP

(57) ABSTRACT

An atmospheric pressure is obtained from an intake pressure resulting immediately before an intake stroke, an injection fuel pressure P is calculated which is constituted by a differential pressure between a fuel pressure which is supplied to an injector 13 from the atmospheric pressure so obtained, a pump delivery pressure and the intake pressure and the intake pressure which is an injection atmosphere, a fuel injection time coefficient $Q_{f0}$ per unit mass which is metered when a reference injection fuel pressure is $P_0$ is divided by a square root $P^{1/2}$ of the injection fuel pressure to calculate a fuel injection coefficient $Q_f$, and a fuel injection time required to attain a desired air-fuel ratio is calculated using the fuel injection coefficient $Q_f$ so calculated, whereby it is possible to realize a highly accurate control of the fuel injection time when a regulator for regulating an upper limit value for a fuel pump delivery pressure is provided on a fuel tank side.

8 Claims, 13 Drawing Sheets

4-STROKE ENGINE CONTROL DEVICE AND CONTROL METHOD

TECHNICAL FIELD

This invention relates to an engine control device for controlling an engine and, more particularly to an engine control device suitable for controlling an engine provided with a fuel injection device for injecting fuel.

BACKGROUND ART

With the widespread of fuel injection devices called injector in recent years, control of fuel injection timing and fuel injection amount, namely, the air-fuel ratio has become easy, which makes it possible to improve engine output and fuel consumption and to clean exhaust gas. As to the fuel injection timing, it is common that a phase state of a camshaft, a state of an intake valve, to be exact, is detected, and, based on the detected result, fuel is injected. However, a cam sensor for detecting the phase state of the camshaft, which is expensive and increases the size of a cylinder head, is difficult to employ in motorcycles or the like, in particular. To solve this problem, an engine control device adapted to detect a phase state of a crankshaft and an intake pipe pressure and, based on those, to detect a stroke state of a cylinder is proposed in JP-A-H10-227252. With this prior art, it is possible to detect a stroke state of a cylinder without detecting a phase of a camshaft, so that it is possible to control fuel injection timing based on the stroke state.

To inject fuel from a fuel injection device as mentioned above, the fuel in the fuel tank must be pressurized by a fuel pump before supplied to the fuel injection device. As is well known, since the pressure of the fuel pressurized by the pump fluctuates, a pressure control valve called regulator is used to provide an upper limit on the fuel pressure. In the case of a motorcycle, the regulator is generally provided in the close vicinity of the fuel injection device and is usually so constituted that a prescribed regulator control pressure usually set by a spring or the like is added to the fuel on top of a pressure of an atmosphere into which the fuel is injected by the fuel injection device, for example, a pressure in an intake pipe, as a back pressure. Thus, the fuel injection pressure, which is a difference between the pressure of the fuel supplied to the fuel injection device and the pressure of the atmosphere into which the fuel is injected, is always equivalent to the regulator control pressure of the regulator.

However, when the regulator is provided in the close vicinity of the fuel injection device, a return line for returning surplus fuel from the regulator to the fuel tank must be provided for each fuel injection device. Also, in most cases, the regulator is manufactured by the same manufacturer of the pump but, when the pump and the regulator are disposed separately, they are supplied separately. This increased the number of parts and makes cost reduction by making parts into assemblies impossible. Then, it can be thought to place the regulator in the vicinity of the pump by, for example, making the pump and the regulator into an assembly. This constitution not only makes the return line unnecessary but also makes it possible to reduce the number of parts and the costs.

However, in the event that the regulator is disposed on the pump side as has been described above, since the back pressure of the regulator is constituted by the atmospheric pressure, where the atmospheric pressure changes as the altitude changes, the fuel pressure also changes. There has been proposed a fuel injection control method which is described, for example, in JPA-A-S61-178526 as a method for compensating for a change in fuel pressure caused when the atmospheric pressure fluctuates. In this fuel injection control method, an atmospheric pressure is detected by an atmospheric pressure sensor, whereby the fuel injection amount is corrected based, for example, on a ratio between a reference atmospheric pressure and an atmospheric pressure so detected. According to this method, while the fuel injection amount can be compensated irrespective of the fluctuation of atmospheric pressure, the atmospheric pressure sensor is needed, and the number of components is increased by the additional of such a component, this leading to an increase in production costs.

When the regulator is placed in the vicinity of the pump, the back pressure of the regulator must be ambient pressure, so that the pressure of the fuel supplied to the fuel injection device is generally constant (When the ambient pressure changes with altitude, for example, the fuel pressure is also changed.). On the other hand, when no surge tank is provide in the intake pipe as in the case of motorcycles, the pressure in the intake pipe into which the fuel is injected, namely the pressure of the atmosphere into which the fuel is injected is changeable. This means that the injection fuel pressure, which is the difference between the pressure of the fuel supplied to the fuel injection device and the pressure of the atmosphere into which the fuel is injected, is unstable. When the injection fuel pressure is unstable, the amount of fuel injected from the injection device per a unit time becomes unstable. This makes it impossible to obtain a fuel injection amount to attain a desired air-fuel ratio only by controlling the fuel injection time.

As a device for correcting the fuel injection amount based on an injection fuel pressure, there is an engine control device disclosed in JA-A-H08-326581. The engine control device detects an injection fuel pressure, integrates it over a given period of time to obtain the area thereof, compares the area with reference area values, and corrects the fuel injection amount based on the comparison result. In this engine control device, however, the infection fuel pressure must be integrated, so that the operation load is unavoidably large. Also, since the reference values with which the integral value of the injection fuel pressure is compared must be organized into a map for every operation state of the engine and stored, a memory with a large capacity is needed. Naturally, the operation load in withdrawing the maps and making the comparison is large.

The invention was made with a view to resolving the problems and an object thereof is to provide a control device for a four-stroke engine which can accurately control the fuel injection amount and time at a transitional time while reducing an operational load related to the control of fuel injection and which can attempt to reduce the number of components and production costs.

DISCLOSURE OF THE INVENTION

According to a first aspect of the Invention, there is proposed a control device for a four-stroke engine having an intake valve between a combustion chamber and an intake port and having at least one intake control valve for one intake port of the combustion chamber, the control device comprising a pump for pressurizing a fuel in a fuel tank, a regulator opened to an atmospheric pressure for regulating an upper limit value for the fuel pressurized by the pump, a fuel injection device for injecting the fuel regulated an upper limit value thereof by the regulator into the intake port, intake pressure detecting unit for detecting an intake pressure between the intake control valve and the combustion chamber, at least either atmospheric pressure detecting unit for detecting an atmospheric pressure or pump delivery pressure detecting unit for detecting the pressure of the fuel pressurized by the pump, and fuel injection control unit for controlling the fuel injection device based on at least either of an atmospheric pressure detected by the atmospheric pressure detecting unit and a fuel pressure detected by the pump delivery pressure detecting unit and an intake pressure detected by the intake pressure detecting unit, wherein the intake pressure detecting unit detects an intake pressure a plurality of times while the four-stroke engine completes four strokes of intake stroke, compression stroke, expansion stroke and exhaust stoke, and the fuel injection control unit calculates a fuel injection time based on at least one of a plurality of intake pressure values detected by the intake pressure detecting unit so as to inject the fuel with an injection initiating timing according to the fuel injection time so calculated.

According to a second aspect of the invention, there is proposed a control device for a four-stroke engine as set forth in the first aspect of the invention, wherein the pump and the regulator are disposed within the fuel tank.

According to a third aspect of the invention, there is proposed a control device for a four-stroke engine as set forth in the first or second aspect of the invention, wherein the intake pressure detecting unit detects the intake pressure at least when a fuel injection time calculated by the fuel injection control unit is over or is about to be over.

According to a fourth aspect of the invention, there is proposed a control device for a four-stroke engine as set forth in any of the first to third aspects of the invention, wherein only the pump delivery pressure detecting unit is provided.

According to a fifth aspect of the invention, there is proposed a control device for a four-stroke engine as set forth in any of the first to third aspects of the invention, wherein only the atmospheric pressure detecting unit is provided.

According to a sixth aspect of the invention, there is proposed a control device for a four-stroke engine as set forth in any of the first to third aspects, or the fifth aspect of the invention, wherein the atmospheric pressure detecting unit detects an atmospheric pressure from an intake pressure detected by the intake pressure detecting unit.

According to a seventh aspect of the invention, there is proposed a control device for a four-stroke engine as set forth in any of the first to third aspects, or in the fifth or sixth aspect of the invention, wherein the intake pressure detecting unit detects at least an intake pressure resulting immediately before the intake valve opens.

According to an eighth aspect of the invention, there is proposed a method for controlling a four-stroke engine having an intake valve between a combustion chamber and an intake port and having at least one intake control valve for one intake port of the combustion chamber, the method comprising the steps of pressurizing a fuel in a fuel tank, regulating by a regulator opened to an atmospheric pressure an upper limit value for the fuel pressurized by the pump, injecting the fuel regulated an upper limit value thereof by the regulator into the intake port, detecting an intake pressure between the intake control valve and the combustion chamber, performing at least either the step of detecting an atmospheric pressure or the step of detecting the pressure of the fuel so pressurized, and controlling the fuel injection based on at least either an atmospheric pressure detected through the step of detecting an atmospheric pressure or a fuel pressure detected through the step of detecting a fuel pressure and an intake pressure detected through the step of detecting an intake pressure, wherein in the step of detecting an intake pressure, an intake pressure is detected a plurality of times while the four-stroke engine completes four strokes of intake stroke, compression stroke, expansion stroke and exhaust stoke, and in the step of controlling the fuel injection, a fuel injection time is calculated based on at least one of a plurality of intake pressure values detected through the step of detecting an intake pressure so that the fuel is injected with an injection initiating timing according to the fuel injection time so calculated.

BEST MODE FOR CARRYING OUT THE INVENTION

Embodiments of the invention will be described below.

Figure 1:
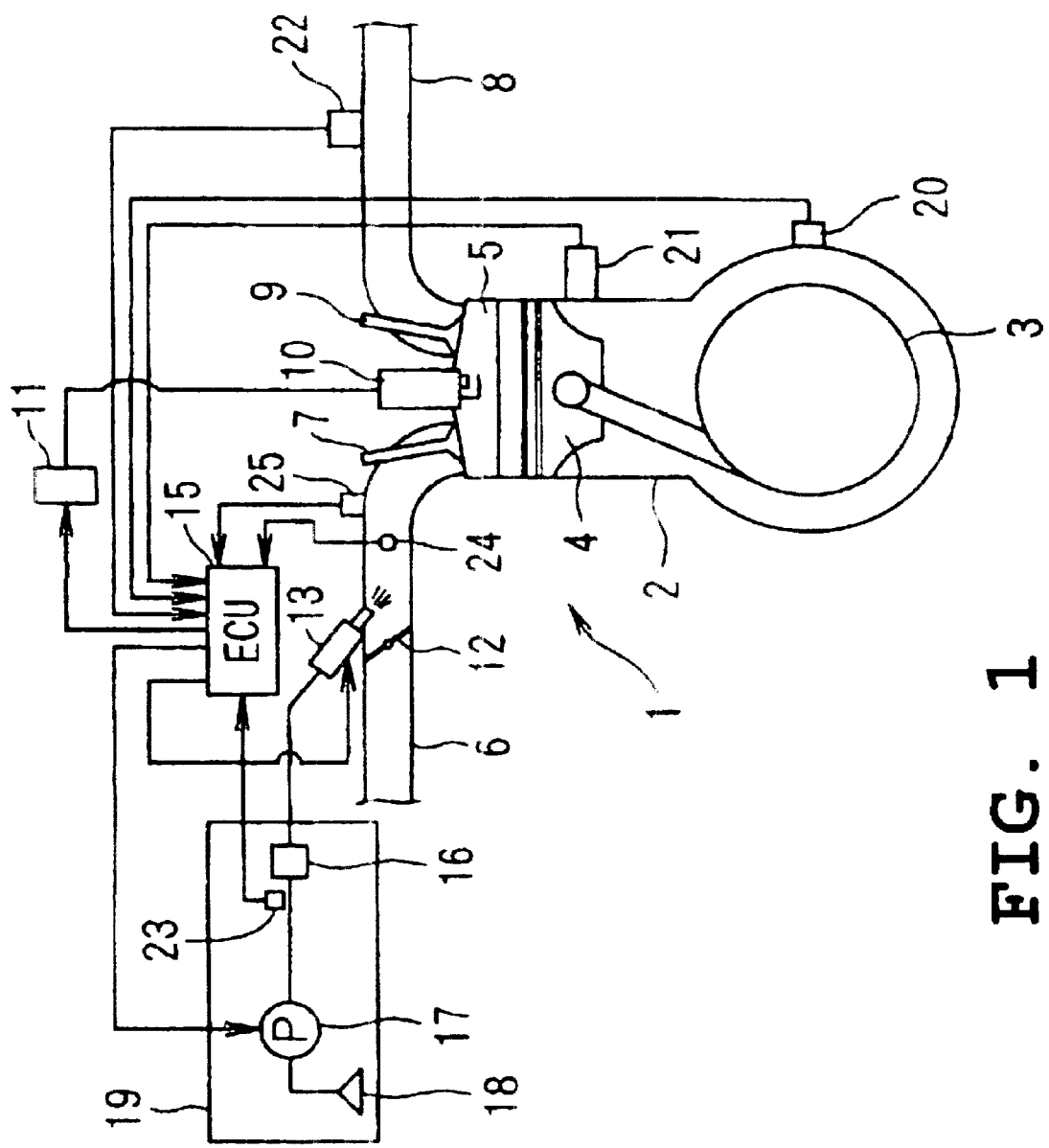
FIG. 1 is a schematic view illustrating the configuration of a motorcycle engine and a control device therefor according to a first embodiment of the invention.

FIG. 1 is a schematic diagram illustrating the configuration of, for example, a motorcycle engine and a control device therefor according to a first embodiment of the invention. The engine 1 is a four-cylinder, four-cycle engine and has a cylinder body 2, a crankshaft 3, a piston 4, a combustion chamber 5, an intake pipe 6, an intake valve 7, an exhaust pipe 8, an exhaust valve 9, a spark plug 10, and an ignition coil 11. Note that the intake pipe 6, which is independent, is connected to each of four combustion chambers 5, a throttle valve 12 which functions as an intake control valve which opens and closes according to the position or opening of the throttle valve 12 is provided in each intake pipe 6, and an injector 13, which functions as a fuel injection device, is provided a downstream side of the throttle valve 12 or a combustion chamber side of the intake pipe 6. The injector 13 is connected to a filter 18, a fuel pump 17 and a regulator 16 which are housed in a fuel tank 19. The regulator 16 provides an upper limit on the pressure applied to the fuel by the fuel pump 17. A regulator housed in the fuel tank 19 is arranged such that a prescribed regulator control pressure is applied with the ambient pressure serving as the back pressure. Thus, when the pump delivery pressure is lower than the regulator control pressure, the pump delivery pressure (more accurately, the pump delivery pressure including ambient pressure as a back pressure) is the pressure of the fuel supplied to the injector 13. The engine 1 employs an independent suction system, so that the injector 13 is provided in each intake pipe 6 of each cylinder.

The operating state of the engine 1 is controlled by an engine control unit 15. As means for performing control input into the engine control unit 15, namely means for detecting the operating state of the engine 1, there are provided a crank angle sensor 20 for detecting the rotational angle, namely phase, of the crankshaft 3, a cooling water temperature sensor 21 for detecting the temperature of the cylinder body 2 or cooling water, namely the temperature of the engine body, an exhaust air-fuel ratio sensor 22 for detecting the air-fuel ratio in the exhaust pipe 8, a fuel pressure sensor 23 for detecting the fuel delivery pressure of the fuel pump 17 as the pressure of the fuel supplied to the injector 13, an intake pipe pressure sensor 24 for detecting the pressure of intake air in the intake pipe 6, and an intake air temperature sensor 25 for detecting the temperature in the intake pipe 6, namely the temperature of intake air. The engine control unit 15 receives detecting signals from the sensors and outputs control signals to the fuel pump 17, the injector 13 and the ignition coil 11.

Figure 2:
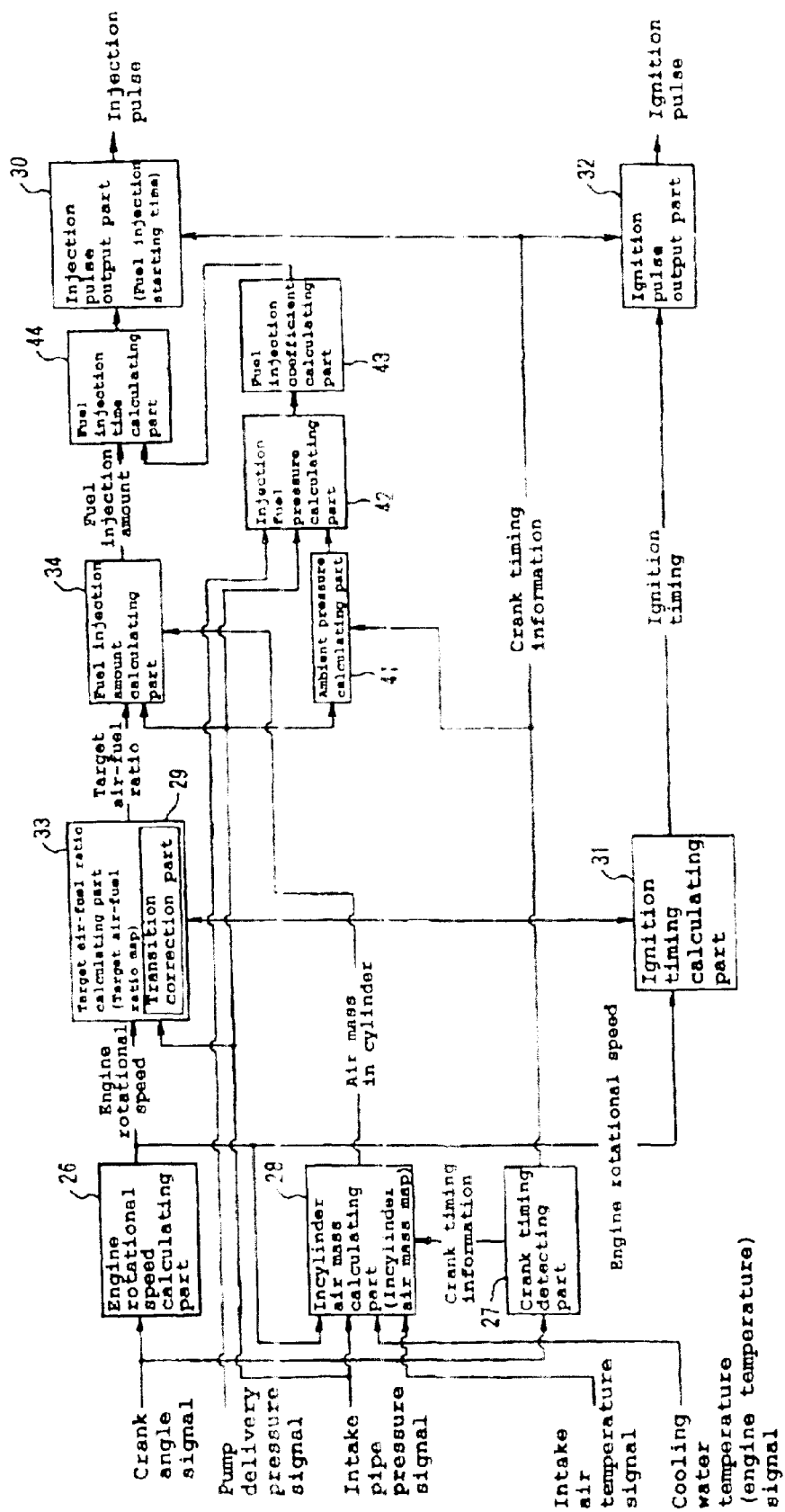
FIG. 2 is a block diagram illustrating an operational process implemented by the engine control unit shown in FIG. 1.

The engine control unit 15 is constituted of a microcomputer (not shown) and so on. FIG. 2 is a block diagram illustrating an embodiment of the engine control operation performed by the microcomputer in the engine control unit 15. The engine control operation is performed by an engine rotational speed calculating part 26 for calculating the engine rotational speed based on a crank angle signal, a crank timing detecting part 27 for detecting crank timing information, namely the stroke state based on the crank angle signal and an intake pipe pressure signal, an incylinder air mass calculating part 28 for calculating the air mass in the cylinder (amount of intake air) based on the crank timing information detected by the crank timing detecting part 27 together with an intake air temperature signal, an cooling water temperature (engine temperature) signal, the intake pipe pressure signal and the engine rotational speed calculated by the engine rotational speed calculating part 26, a target air-fuel ratio calculating part 33 for calculating a target air-fuel ratio based on the engine rotational speed calculated in the engine rotational speed calculating part 26 and the intake pipe pressure signal, a fuel injection amount calculating part 34 for calculating the amount of fuel to be injected based on the target air-fuel ratio calculated in the target air-fuel ratio calculating part 33, the intake pipe pressure signal and the air mass in the cylinder calculated in the incylinder air mass calculating part 28, an ambient pressure calculating part 41 for calculating the ambient pressure based on the intake pipe pressure signal and the crank timing information detected by the crank timing detecting part 27, a injection fuel pressure calculating part 42 for calculating the injection fuel pressure based on the ambient pressure calculated in the ambient pressure calculating part 41, the pressure of fuel supplied to the injector 13 detected by the fuel pressure sensor 23 and the intake pipe pressure signal, a fuel injection coefficient calculating part 43 for calculating a fuel injection coefficient based on the fuel injection pressure calculated in the fuel injection pressure calculating part 42, a fuel injection time calculating part 44 for calculating the fuel injection time based on the amount of fuel to be injected calculated in the fuel injection amount calculating part 34 and the fuel injection coefficient calculated in the fuel injection coefficient calculating part 43, an injection pulse output part 30 for outputting injection pulses to the injector 13 based on the fuel injection time calculated in the fuel injection time calculating part 44 and the crank timing information detected by the crank timing detecting part 27, an ignition timing calculating part 31 for calculating ignition timing based on the engine rotational speed calculated in the engine rotational speed calculating part 26 and the target air-fuel ratio set in the target air-fuel ratio calculating part 33, and an ignition pulse output part 32 for outputting ignition pulses corresponding to the ignition timing set in the ignition timing calculating part 31 to the ignition coil 11 based on the crank timing information detected by the crank timing information detecting part 27.

The engine rotational speed calculating part 26 calculates the rotational speed of the crankshaft as an output shaft of the engine as the engine rotational speed based on the rate of change of the crank angle signal with time.

Figure 3:
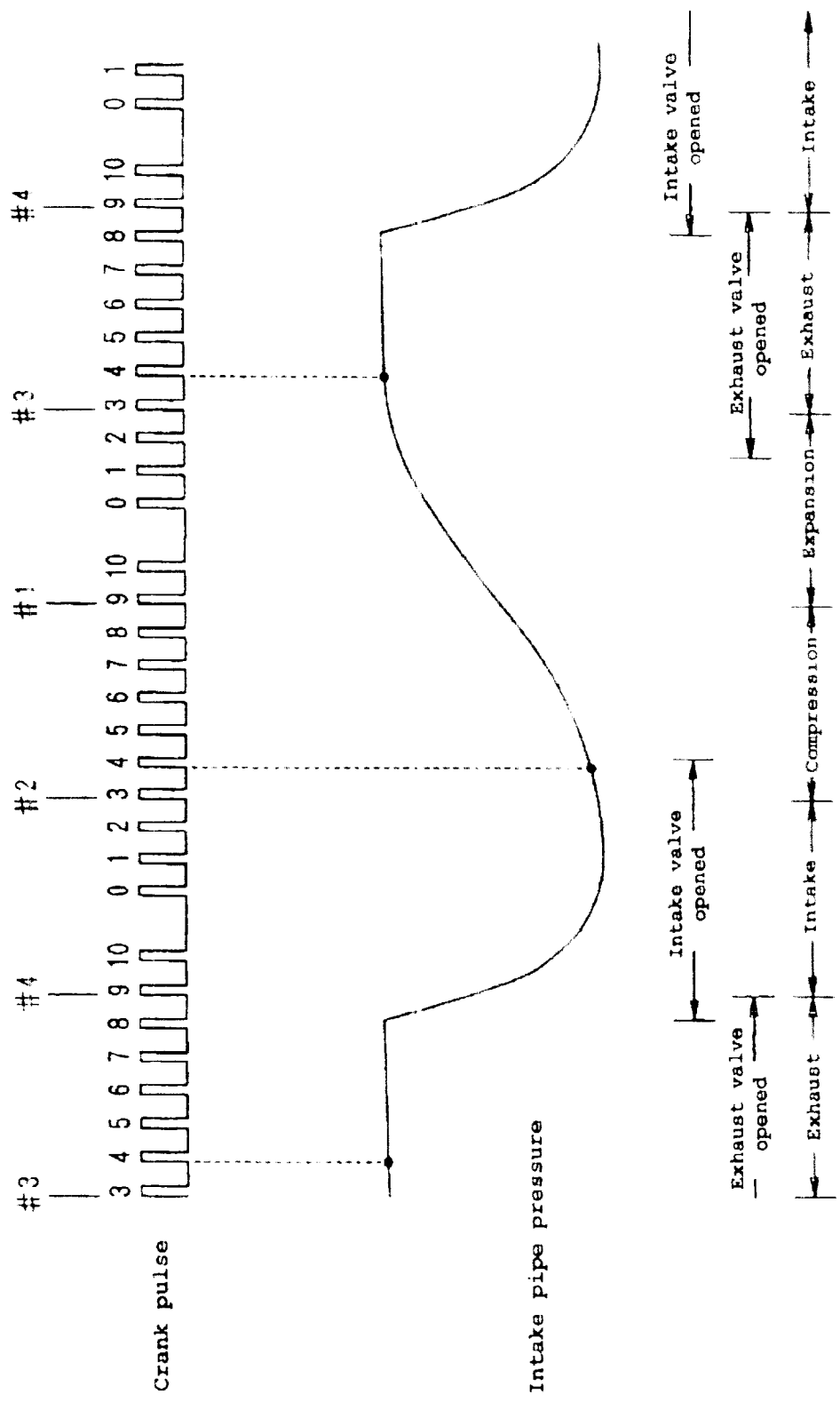
FIG. 3 is an explanatory view illustrating the detection of a stroke state from the phase of a crankshaft and an intake pressure.

The crank timing detecting part 27, which has a constitution similar to the stroke judging device disclosed in JA-A-H10-227252, detects the stroke state of each cylinder as shown in FIG. 3, for example, and outputs it as crank timing information. Namely, in a four-cycle engine, the crankshaft and the camshaft are constantly rotated with a prescribed phase difference, so that when crank pulses are read with respect to each 30 degrees rotation of the crank shaft as shown in FIG. 3, the crank pulse "4" represents either an exhaust stroke or a compression stroke. As is well known, during an exhaust stroke, the exhaust valve is closed and the intake valve is opened, so that the intake pipe pressure is high. However, in an initial stage of a compression stroke, the intake pipe pressure is low because the intake valve is still open or because of the previous intake stroke even if the intake valve is closed. Thus, the crank pulse "4" outputted when the intake pipe pressure is low indicates that a second cylinder is in a compression stroke, and when the crank pulse "3" is obtained, the second cylinder is at the intake bottom dead center. When the stroke state of one of the cylinders can be detected as above, since there are prescribed phase differences between the strokes of the cylinders, the stroke state of the other cylinders can be determined. For example, the first crank pulse "9" after the crank pulse "3" indicating that the second cylinder is at its intake bottom dead center indicates that the first cylinder is at its intake bottom dead center, the first clank pulse "3" after that indicates that the third cylinder is at its intake bottom dead center, and the first clank pulse "9" after that indicates that the fourth cylinder is at its intake bottom dead center. Then, when the intervals between the pulses are interpolated with the rotational speed of the crankshaft, the present stroke state can be detected in further detail.

Figure 4:
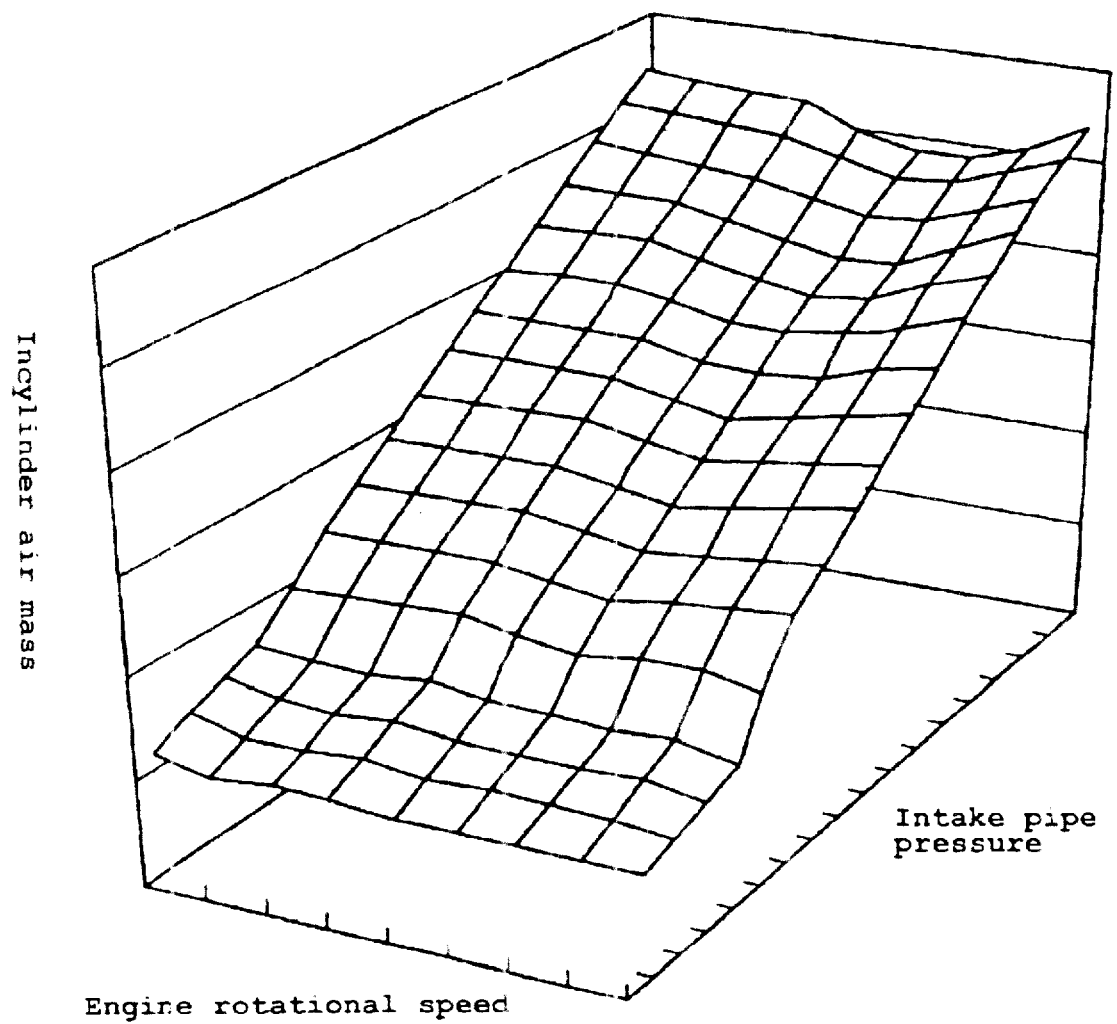
FIG. 4 shows a map stored in an in-cylinder air mass calculating part for calculating an in-cylinder air mass.

The incylinder air mass calculating part 28 has a three-dimensional map as shown in FIG. 4 for use in calculating the air mass in the cylinder based on the intake pipe pressure signal and the engine rotational speed calculated in the engine rotational speed calculating part 26. The three dimensional map of the incylinder air mass can be obtained only by measuring air mass in the cylinder while changing the intake pipe pressure with the engine rotated at a prescribed rotational speed. The measurement can be conducted with a relatively simple experiment, so that the map can be organized with ease. The map could be organized with an advanced engine simulation system. The incylinder air mass, which is changed with engine temperature, may be corrected with the cooling water temperature (engine temperature) signal.

Figure 5:
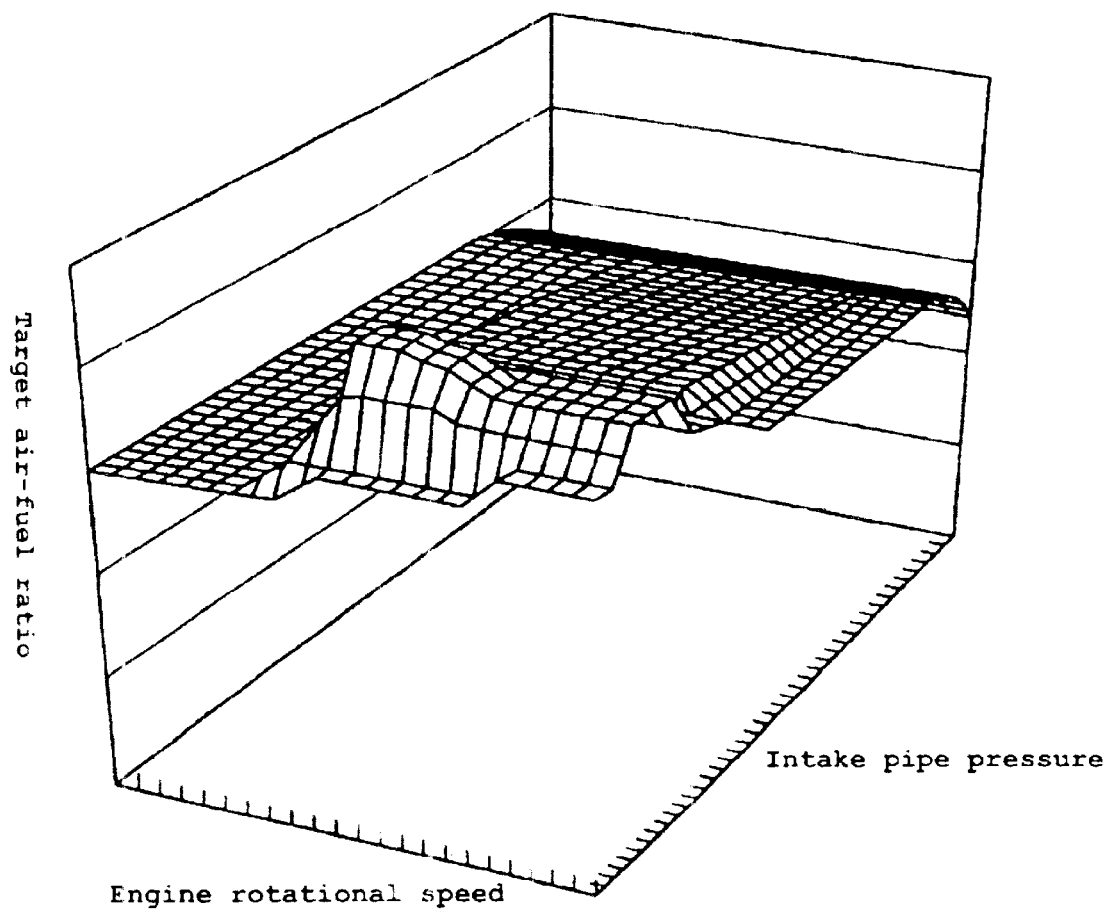
FIG. 5 shows a map stored in a target air-fuel ratio calculating part for calculating a target air-fuel ratio.

The target air-fuel ratio calculating part 33 has a three-dimensional map as shown in FIG. 5 for use in calculating the target air-fuel ratio based on the intake pipe pressure signal and the engine rotational speed calculated in the engine rotational speed calculating part 26. The three-dimensional map can be organized on paper to some extent. In general, the air-fuel ratio is correlated with torque. When the air-fuel ratio is low, namely, when the amount of fuel is large and the amount of air is small, the torque increases but the efficiency decreases. Whereas, when the air-fuel ratio is high, namely, when the amount of fuel is small and the amount of air is large, the torque decreases but the efficiency increases. The state where the air-fuel ratio is low is called "rich" and the state where the air-fuel ratio is high is called "lean". The leanest state is one often referred to as "stoichiometry", where the ideal air-fuel ratio at which complete combustion of gasoline takes place, namely, an air-fuel ratio of 14.7 is attained.

The engine rotational speed is one of parameters indicating running conditions of the engine, and in general, a larger air-fuel ratio is employed at a higher end of the engine rotational speed, whereas a smaller air-fuel ratio is employed at a lower end of the engine rotational speed. This is intended to enhance the response characteristic of the engine torque at the lower end of the engine speed and to enhance the response characteristic of the engine speed at the higher end of the engine speed. In addition, the intake pressure is one of parameters indicating the loaded conditions of the engine such as the throttle position or opening, and in general, a smaller air-fuel ratio is employed when the engine load becomes heavy, that is, when the throttle opening is narrow and the intake pressure is high, whereas a larger air-fuel ratio is employed when the engine load is light, that is, when the throttle opening is wide and the intake pressure is low. This is because an emphasis is put on the torque with the heavy engine load, whereas an emphasis is put on the efficiency with the light engine load.

As above, the target air-fuel ratio has a physical meaning easy to understand and thus can be set to some extent in accordance with required engine output characteristics. It is needless to say that the air-fuel ratio may be tuned in accordance with the output characteristics of an actual engine.

Figure 6:
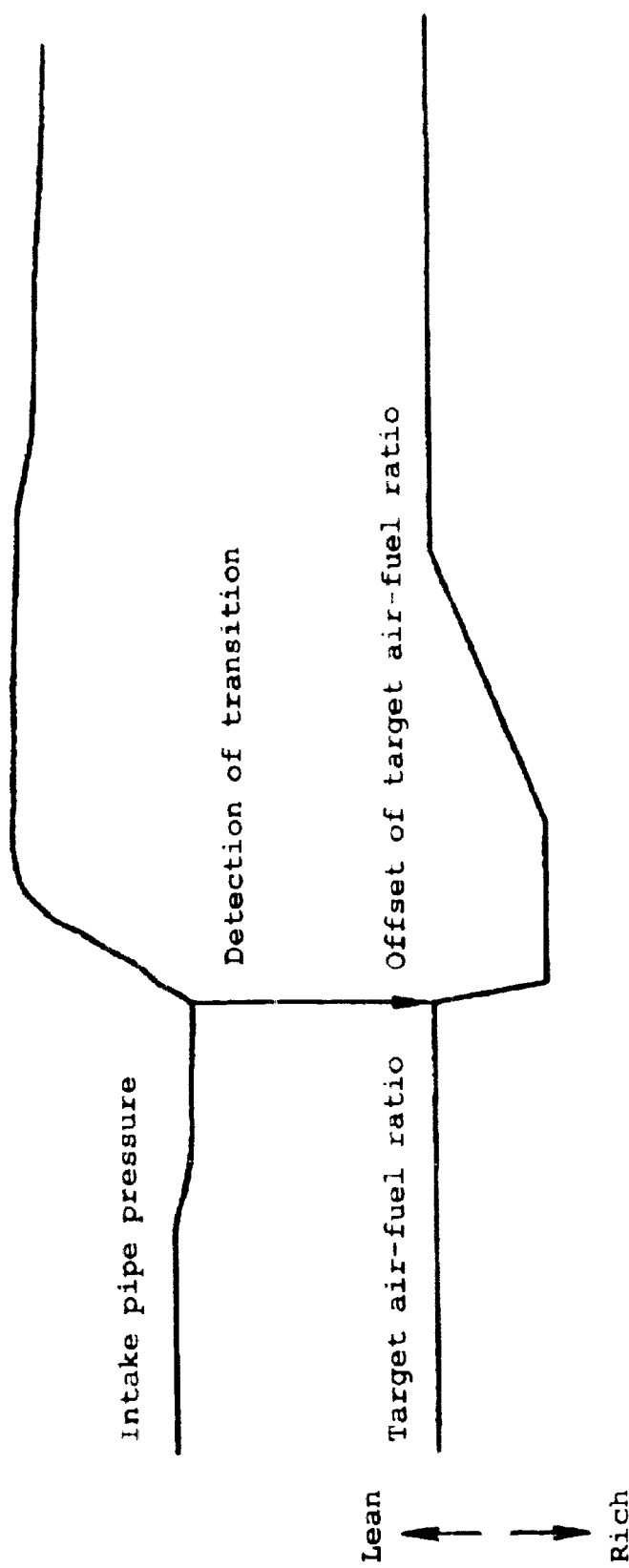
FIG. 6 is an explanatory view illustrating the function of a transition correction part.

The target air-fuel ratio calculating part 33 has a transition correction part 29 for detecting transitions, more specifically, acceleration and deceleration of the engine from the intake pipe pressure signal and correcting the target air-fuel ratio. For example, as shown in FIG. 6, the change of the intake pipe pressure is also a result of an operation of the throttle, so that an increase of the intake pipe pressure indicates that the throttle is opened to accelerate the vehicle, namely, the engine is accelerating. When such an accelerating state is detected, the target air-fuel ratio is set to the rich side temporally and then returned to the original target value. As a method to return the air-fuel ratio to the original value, there may be employed any existing method, such as a method in which a weighing coefficient of a weighted mean of the air-fuel ratio set to the lean side and the original target air-fuel ratio is gradually changed. When a deceleration state is detected, the target air-fuel ratio may be set to the lean side than the original target air-fuel ratio to attain high efficiency.

Note that an intake pressure detected at a predetermined crank timing substantially before the top dead center in a compression stroke was used in setting a target air-fuel ratio using the target air-fuel ratio calculating part 33. In this embodiment, as will be described later on, when detecting an atmospheric pressure, an intake pressure is used which is detected at a predetermined crank timing before the top dead center in an exhaust stroke, to be specific, immediately before an intake stroke or immediately before the intake valve opens. In addition, when detecting an injection fuel pressure, an intake pressure is used which is detected when the fuel injection time is over or is about to be over. Consequently, intake pressures need to be detected at least a plurality of times in the four strokes of intake, compression, expansion and exhaust strokes. Thus, by detecting intake pressures a plurality of times, as has been described previously, an acceleration demand by opening the throttle valve or a transition can be detected.

Figure 7:
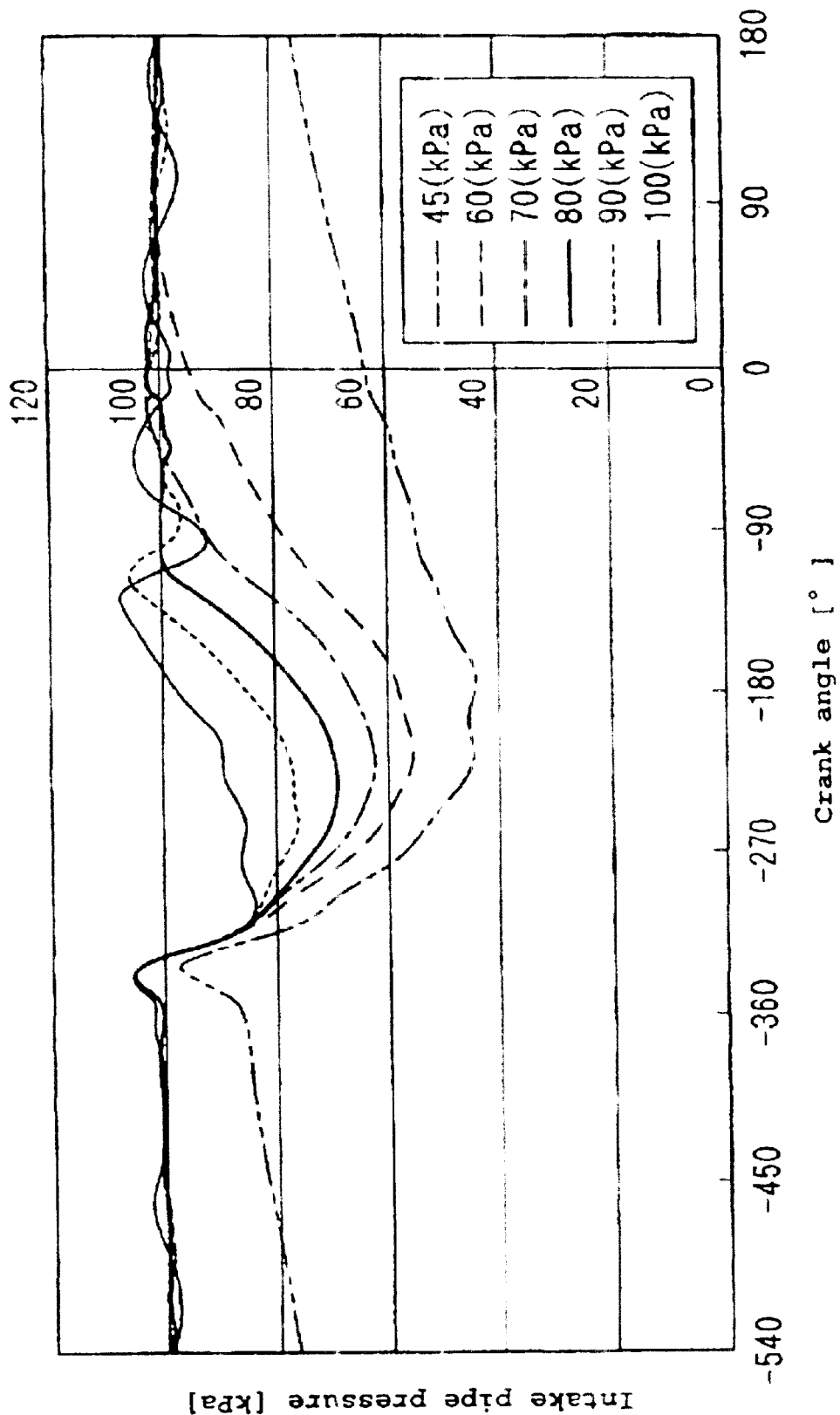
FIG. 7 is an explanatory view illustrating a correlation between a crank angle or a stroke and an intake pressure.

The ambient pressure calculating part 41 calculates the ambient pressure based on the intake pipe pressure signal and the crank timing information. FIG. 7 is a graph of intake pipe pressure versus phase of the crankshaft, namely crank timing information. Each of the curves corresponds to the engine load at the time when the crank angle is −180°. For example, 45 kPa is the minimum engine load and 100 kPa is the maximum engine load. In FIG. 7, an intake stroke is started when tha crank angle is −360°. Immediately before the intake stroke, namely when the crank angle is near −360°, the intake pipe pressure is almost stable and is ambient as described later. In an engine without a supercharger, when the intake pipe pressure is stable, it is because the pressure is about ambient. Thus, in this embodiment, the intake pipe pressure immediately before the intake stroke, namely, immediately before the intake valve is opened is detected as the ambient pressure. However, as is clear from FIG. 7, when the engine load is large, the intake pipe pressure is relatively unstable. Thus, the ambient pressure is detected using an intake pipe pressure at the time when the engine load is small. The intake pipe pressure of 45 kPa at the time when the crank angle is −180° indicates that the engine is nearly idling. In this state, the intake pressure is also unstable. Thus, it is preferred that the ambient pressure be detected using the intake pipe pressure at the time when the engine load is small except when the engine is idling.

Figure 8:
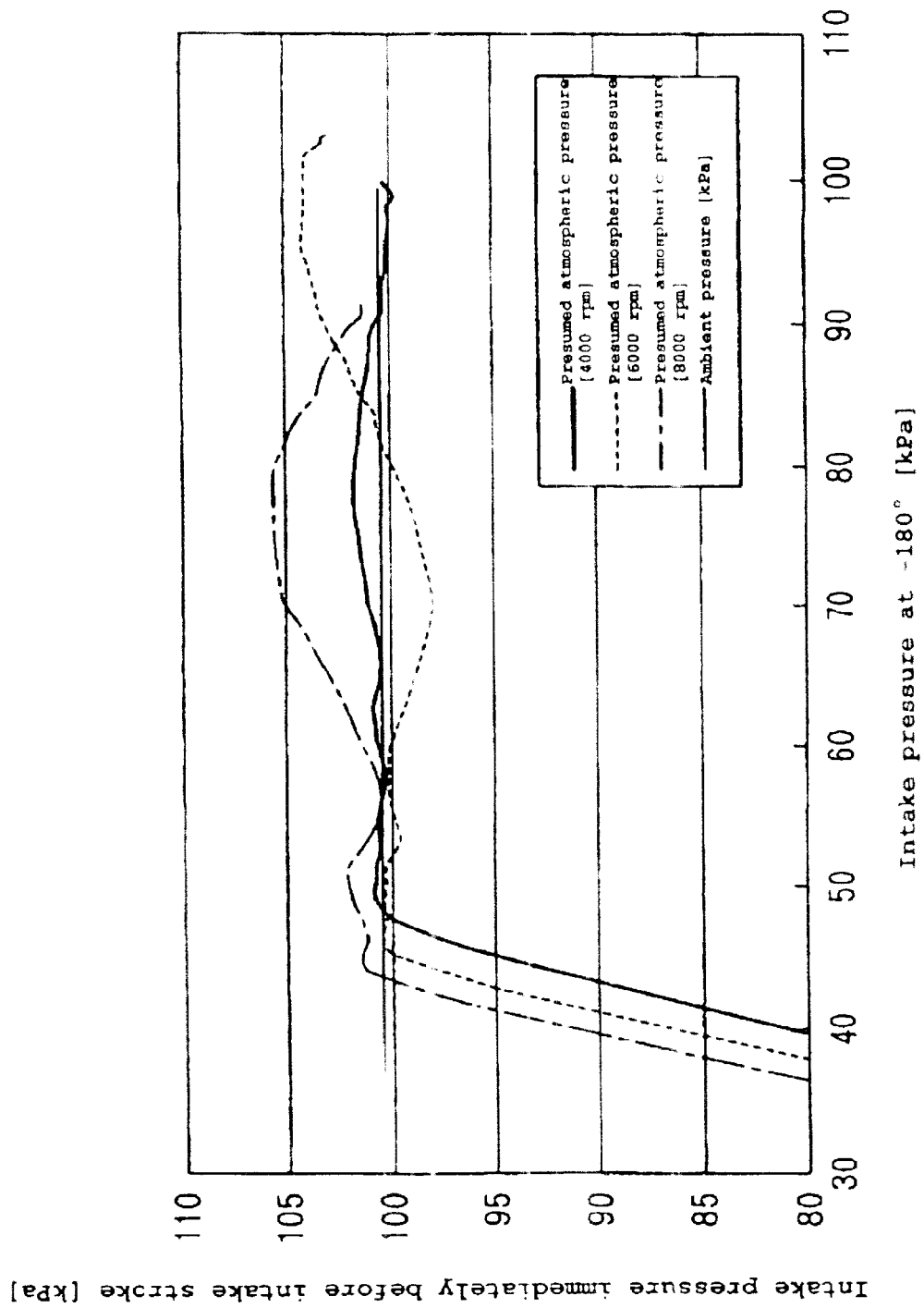
FIG. 8 is an explanatory view illustrating a function between an engine load and an intake pressure immediately before an intake stroke.

FIG. 8 is a graph showing the relation between the intake pipe pressure immediately before an intake stroke and the engine load with the engine rotational speed as a parameter, wherein the intake pipe pressure at the time when the crank angle is −180°, namely the engine load is plotted in the horizontal axis and the pressure immediately before an intake stroke is plotted in the vertical axis. As shown in FIG. 8, even if the engine load is the same, the intake pipe pressure immediately before an intake stroke can be different from the ambient pressure depending upon the engine rotational speed. Thus, to make it exact, the ambient pressure may be detected using the engine rotational speed as one of the parameters by, for example, a method in which the ambient pressure is detected from the intake pipe pressure immediately before an intake stroke only when the rotational speed has reached a predetermined value.

Figure 9:
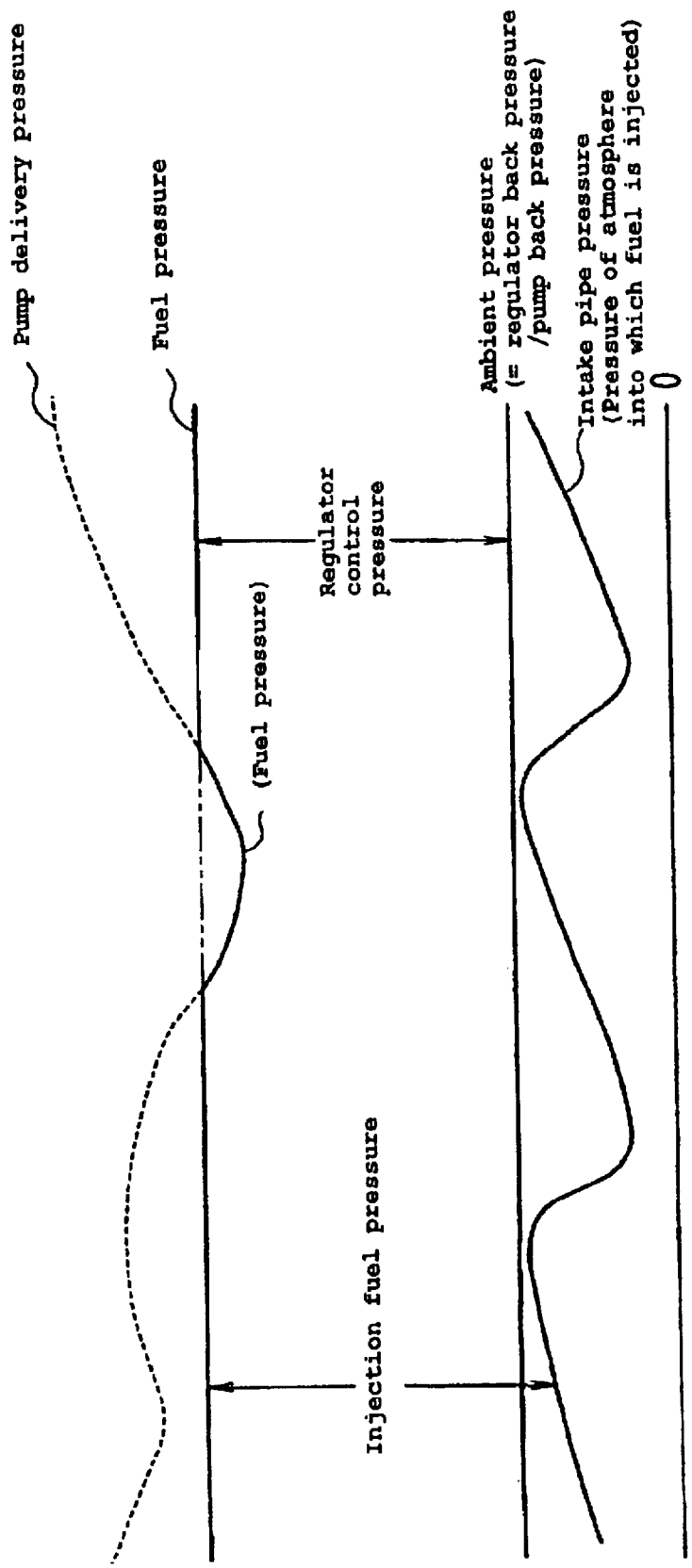
FIG. 9 is an explanatory view illustrating a relationship among a fuel pressure, an intake pressure which is an ambient pressure and an injection fuel pressure.

The injection fuel pressure calculating part 42 calculates the injection fuel pressure, which is the difference between the fuel pressure and the pressure of the atmosphere into which the fuel is injected, based on the intake pipe pressure, the pump delivery pressure, and the ambient pressure calculated in the ambient pressure calculating part 41 and so on. FIG. 9 is a graph showing the relation among the fuel pressure, the intake pipe pressure as the atmosphere pressure, and the injection fuel pressure. In the case where the fuel pump 17 and the regulator 16 is disposed in the vicinity of the fuel tank as in this embodiment, the pump back pressure and the regulator back pressure are both ambient (the fuel tank is not completely airtight). The pump delivery pressure and the regulator control pressure rise on top of the ambient pressure. When the pump delivery pressure is smaller than the regulator control pressure, the pump delivery pressure will be the fuel pressure. When the pump delivery pressure is the regulator control pressure or higher, the regulator control pressure will be the fuel pressure. After the calculation of the injection fuel pressure by the above comparison, the injection fuel pressure is calculated by subtracting the intake pipe pressure (the pressure of the atmosphere into which the fuel is injected) therefrom. In the case of a motorcycle, especially, since no surge tank is provided in the intake pipe, the intake pipe pressure varies greatly as shown in FIG. 9. Thus, in order to control the fuel injection amount by the fuel injection time as described later, the injection fuel pressure must be detected accurately. In this embodiment, the ambient pressure can be detected from the intake pipe pressure and the injection fuel pressure can be accurately detected from the pump delivery pressure and the intake pipe pressure, as mentioned above. Also, since no ambient pressure sensor is needed, the cost can be reduced for that. Note that as an intake pressure used when calculating the injection fuel pressure the intake pressure is used which was detected when the previous fuel injection time was over or was about to be over when implementing the operational process. This is because the amount of fuel injected from the injector 13 is most stable when the fuel injection time is over or is about to be over in the operational process due to the delay in response of the injector 13, and as a result, the intake pressure in the time zone becomes most stable.

Next, the fuel injection coefficient calculating part 43 calculates a fuel injection coefficient for use in calculation of the fuel injection time based on the injection fuel pressure calculated in the injection fuel pressure calculating part 42. The flow velocity $v_1$ of the fuel supplied to the injector 13 can be regarded as substantially 0, the equation (1) is established by Bernoulli's theorem.

$$P_1 = \rho \cdot v_2^2 / 2 + P_2 \qquad (1)$$

wherein $\rho$ is the density of the fuel, $P_1$ is the pressure of the fuel supplied to the injector 13, namely the fuel pressure, $v_2$ is the flow velocity of the fuel injected from the injector into the intake pipe and $P_2$ is the pressure of the atmosphere into which the fuel in injected, namely the intake pipe pressure.

When the equation is solved for $v_2$, the equation (2) is obtained:

$$v_2 = (2(P_1 - P_2)/\rho)^{1/2} \qquad (2)$$

Here, $(P_1-P_2)$ in the equation (2) is the injection fuel pressure calculated in the injection fuel pressure calculating part 42. Letting $P=(P_1-P_2)$, the fuel mass M injected from the injector 13 per a unit time can be obtained from the equation (3):

$$M = S \cdot v_2 \cdot \rho = S \cdot (2\rho \cdot P)^{1/2} \qquad (3)$$

wherein S is the cross-sectional area of the injection port of the injector 13.

This indicates that the fuel mass M injected from the injector 13 per a unit time is in proportion to the square root of the injection fuel pressure P.

Then, setting a reference injection fuel pressure $P_0$ and letting $Q_{t0}$ be a fuel injection coefficient (injection fuel flow rate characteristic coefficient) which gives a unit mass of fuel to be injected when the injection fuel pressure is the reference injection fuel pressure $P_0$, the fuel injection coefficient (injection fuel flow rate characteristic coefficient) $Q_t$ which gives a unit mass of fuel to be injected when the injection fuel pressure is P is given by the following equation (4):

$$Q_t = Q_{t0} \times (P_0/P)^{1/2} \qquad (4)$$

Thus, by multiplying the fuel injection amount by the fuel injection coefficient (injection fuel flow rate characteristic coefficient) $Q_t$, the fuel injection time can obtained.

Thus, the fuel injection time calculating part 44 calculates the fuel injection time T by multiplying the fuel injection amount V calculated in the fuel injection amount calculating part 34 by the fuel injection coefficient (injection fuel flow rate characteristic coefficient) $Q_t$. Namely, when letting the product of the injection fuel flow rate characteristic coefficient $Q_{t0}$ obtained when the injection fuel pressure is the reference injection fuel pressure $P_0$, the fuel injection amount V to attain a desired air-fuel ratio, and the square root $P_0^{1/2}$ of the reference injection fuel pressure be a preset value, the fuel injection time T calculated through the arithmetic process performed in the fuel injection time coefficient calculating part 43 and the fuel injection time calculating part 44 is a value obtained by dividing the preset value by the square root of the injection fuel pressure, namely $P^{1/2}$.

Then, the injection pulse output part 30 calculates a fuel injection initiating timing from crank timing information detected at the crank timing detecting part 27 and outputs to the injector 13 an injection pulse based on the fuel injection time calculated at the fuel injection time calculating part 44.

Thus, according to the embodiment of the invention, by performing the detection of an intake pressure a plurality of times while the four-stroke engine completes the four strokes of intake, compression, expansion and exhaust strokes thereof, a change in intake pressure every time the strokes change can be detected to thereby detect a transition, thereby making it possible to have a target air-fuel ratio or to inject fuel according to the transition so detected. In addition, since an accurate injection fuel pressure is detected using at least one of the plurality of intake pressure values detected, to be specific, an intake pressure at the optimum timing for calculating a fuel injection time, that is, at the time when the fuel injection is over or is about to be over in the operational process so that an accurate fuel injection time can be set using the accurate injection fuel pressure so detected, fuel can be injected with an optimum injection initiating timing so as to improve the combustion efficiency.

In this embodiment, as described above, the regulator 16 is placed in the vicinity of the fuel tank 19 together with the fuel pump 17, the difference between the pressure of fuel supplied to the injector 13 and the pressure of the atmosphere into which the fuel is injected, namely the intake pipe pressure, is detected as the injection fuel pressure, and, based on the square root of the thus detected injection fuel pressure, the fuel injection time during which the fuel is injected from the injector 13 is controlled. Thus, since neither integration of the injection fuel pressure nor a large number of maps are needed, the operation load can be reduced. Also, it is possible to reduce the number of parts and the costs by making the fuel pump 17 and the regulator 16 into an assembly.

In addition, since the product of the fuel injection coefficient $Q_{f0}$ resulting when the reference injection fuel pressure is $P_0$, the fuel injection amount V required to attain the desired air-fuel ratio and the square root value $P_0^{1/2}$ of the reference injection fuel pressure value is set to the preset value and the fuel injection time T is calculated by dividing the preset value by the square root value $P^{1/2}$ of the injection fuel pressure value, the fuel injection time required to attain the desired air-fuel ratio can be calculated and set easily and accurately. Additionally, as a result, fuel can be injected with the optimum fuel injection timing, whereby the combustion efficiency can be enhanced.

Additionally, since the injection fuel pressure is calculated based on the intake pipe pressure as the pressure of the atmosphere into which the fuel is injected, the ambient pressure and the fuel pressure, it is possible to detect the injection fuel pressure accurately and easily. Also, since the ambient pressure is calculated from the pressure in the intake pipe of the engine, there is no need to provide an ambient pressure sensor, making it possible to reduce the number of parts and the costs. Additionally, since the intake pipe pressure immediately before the intake valve of the engine is opened is calculated as the ambient pressure, it is possible to detect the ambient pressure accurately in real time.

Figure 10:
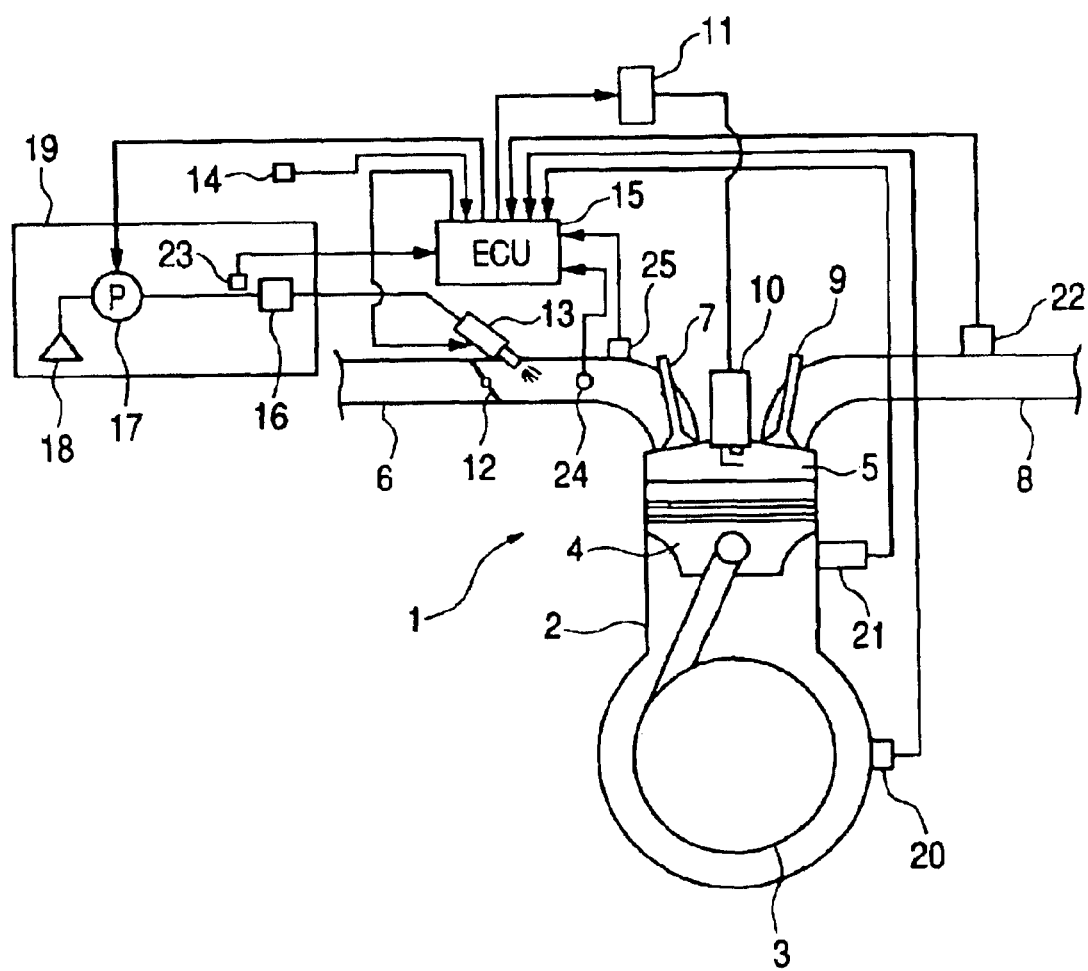
FIG. 10 is a schematic view illustrating the configuration a motorcycle engine and a control device therefor according to a second embodiment of the invention.
Figure 11:
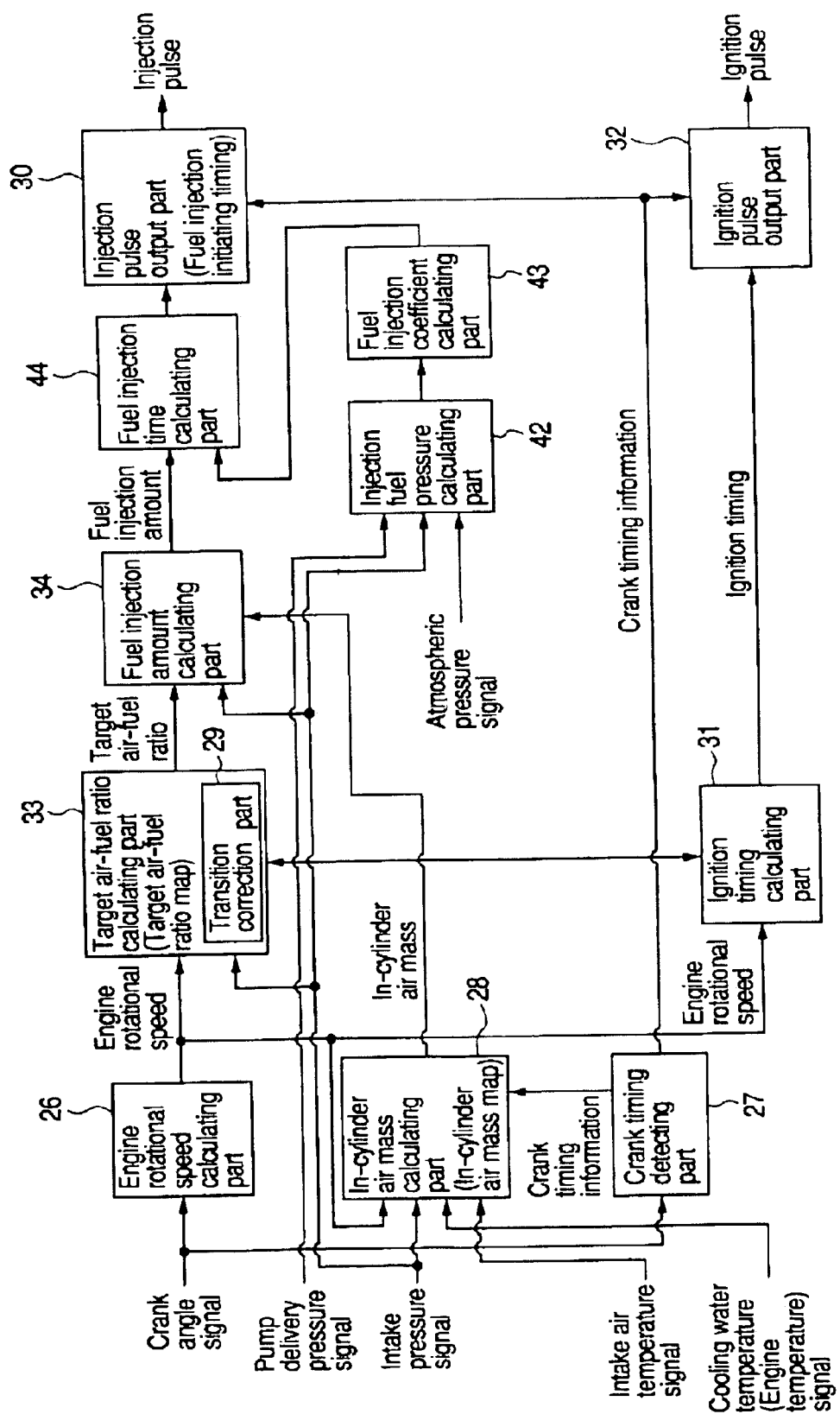
FIG. 11 is a block diagram illustrating an operational process implemented by the engine control unit shown in FIG. 10.

Next, a second embodiment of a control device for a four-stroke engine according to the invention will be described. The description will be made by reference to FIG. 10. In this embodiment, in addition to the configuration of the first embodiment, an atmospheric pressure sensor 14 is added as an atmospheric pressure detecting unit. Thus, since, with the provision of the atmospheric pressure sensor 14 which can detect directly an atmospheric pressure, there is no need to calculate an atmospheric pressure from an intake pressure as is done in the first embodiment, an operational process that will be executed by the engine control unit 15 becomes what is shown in FIG. 11, in which the atmospheric pressure calculating part 41 provided in the first embodiment is removed and an atmospheric pressure signal detected by the atmospheric pressure sensor 14 is fetched to the injection fuel pressure calculating part 42. Where atmospheric pressures can be detected directly, as has been described above, the operational process of calculating an atmospheric pressure from an intake pressure can be omitted, and hence the operation load can be reduced by such an extent.

Figure 12:
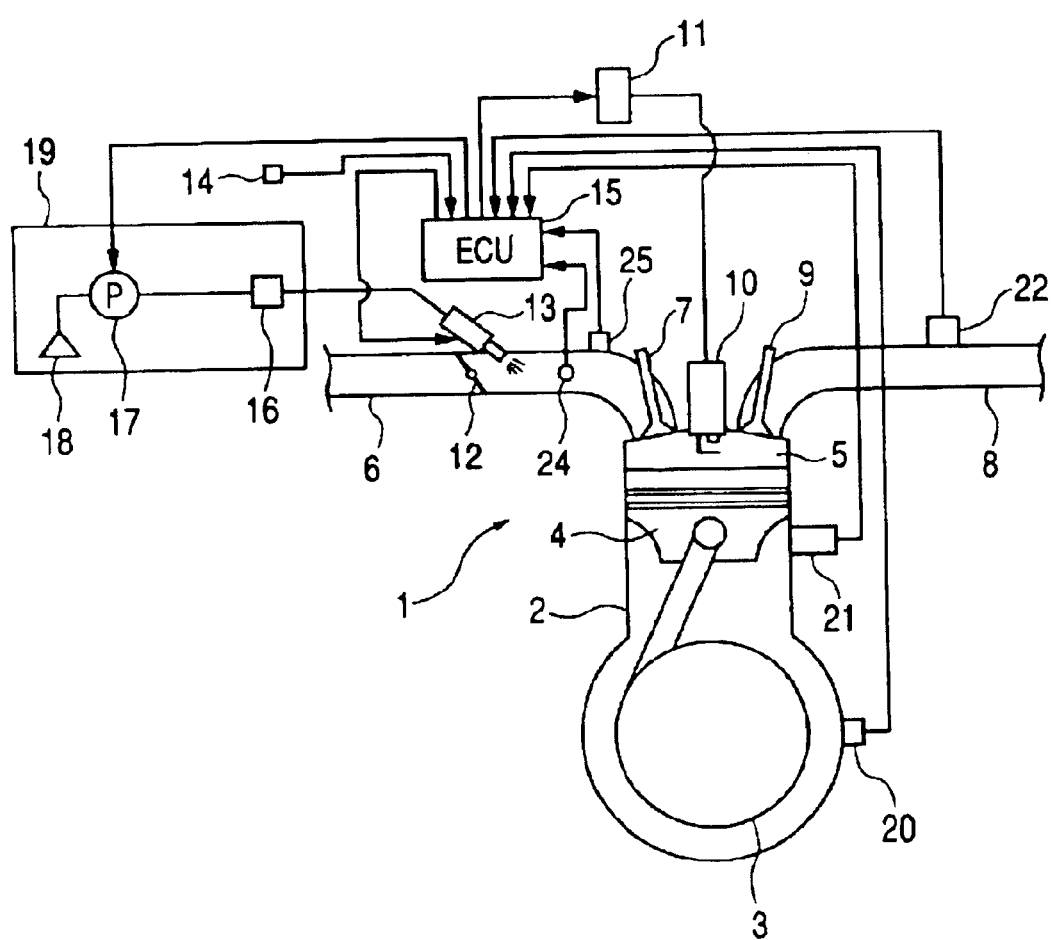
FIG. 12 is a schematic view illustrating the configuration of a motorcycle engine and a control device therefore according to a third embodiment of the invention.
Figure 13:
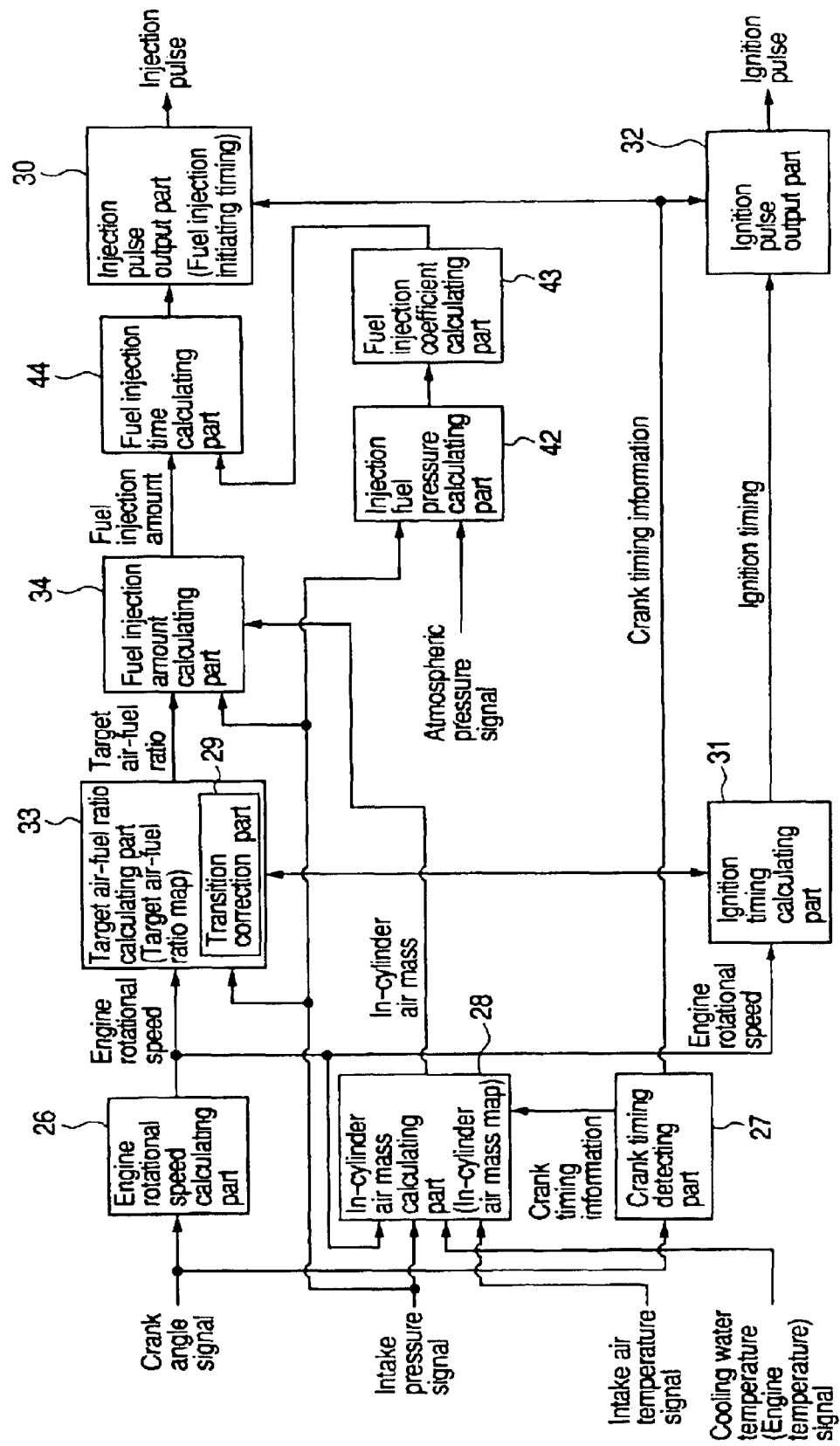
FIG. 13 is a block diagram illustrating an operational process implemented by the engine control unit shown in FIG. 12.

Next, a third embodiment of a control device for a four-stroke engine according to the invention will be described. The description will be made by reference to FIG. 12. In this embodiment, the pump delivery pressure sensor 23 is removed from the configuration of the second embodiment. As has been described previously, unless the lower limit value of the pump delivery pressure becomes smaller than the regulator control pressure, the fuel pressure remains equal to the regulator control pressure. In this embodiment, a pump having a sufficient delivery pressure is used for the fuel pump 17 so that the lower limit value of the pump delivery pressure does not lower below the regulator control pressure, whereby the fuel pressure is made to be constant relative to the regulator control pressure, thereby the pump delivery pressure sensor 23 being allowed to be removed. In the event that the pump delivery pressure sensor 23 can be omitted as has just been described, the number of components involved and production costs can be reduced by such an extent. Note that an operational process that will be executed by the engine control unit 15 in this embodiment is what is shown in FIG. 13, in which the fuel injection pressure calculating part 42 calculates an injection fuel pressure using the regulator control pressure as the fuel pressure.

Note that while the engine of the type in which fuel is injected into the intake port has been described in detail in the respective embodiments above, the control device for a four-stroke engine according to the invention can be applied to engines of a type in which fuel is injected into cylinders, or, so-called engines of a direct injection type.

In addition, while the engine having four cylinders or the so-called multi-cylinder engine has been described in detail in the respective embodiments above, the control device for a four-stroke engine can be applied to a single-cylinder engine.

Additionally, the engine control unit can be replaced by various types of operational circuits instead of the microcomputer.

Moreover, while the pressure sensors which can detect pressures linearly are used to detect the various pressures in the respective embodiments above, a pressure switch adapted to be on and off at a predetermined pressure can also be combined to constitute the pressure detecting unit.

INDUSTRIAL APPLICABILITY

As has been described heretofore, according to the control device for a four-stroke engine of the first aspect of the invention, since the fuel injection device is controlled based on at least either of the atmospheric pressure and the fuel pressure, and the intake pressure, the injection fuel pressure required to control the fuel injection amount by the fuel injection time can be detected accurately and easily. In addition, since intake pressures are detected a plurality of times while the four-stroke engine completes its four strokes of intake, compression, expansion and exhaust strokes, a change in intake pressure resulting every time the strokes change can be detected so as to detect a transition, whereby fuel can be injected according to the transition so detected. Moreover, since a fuel injection time is calculated based on at least one of the plurality of intake pressure values so detected, whereby fuel is injected with an injection initiating timing according to the fuel injection time so calculated, an accurate fuel injection time can be set using an intake pressure detected at a timing which is optimum to calculate the fuel injection time, and as a result, fuel can be injected with the optimum injection initiating timing so as to enhance the combustion efficiency.

In addition, according to the control device for a four-stroke engine of the second aspect of the invention, the pump and the regulator are disposed within the fuel tank so as to be part of the fuel tank assembly, whereby the number of components to be assembled individually and hence production costs can be reduced.

Additionally, according to the control device for a four-stroke engine of the third aspect of the invention, since an intake pressure is detected at least when the fuel injection time so calculated is over or is about to be over, a steady intake pressure resulting substantially while fuel is being injected can be detected, whereby the fuel injection pressure can be detected more accurately and easily.

Furthermore, according to the control device for a four-stroke engine of the fourth aspect of the invention, since the provision of only the pump delivery pressure detecting unit is made possible by adopting the configuration in which an atmospheric pressure is detected from an intake pressure, the necessity of the atmospheric pressure can be obviated, and the number of components involved and production costs can be attempted to be reduced by such an extent.

Moreover, according to the control device for a four-stroke engine of the fifth aspect of the invention, since the provision of only the atmospheric pressure is made possible by adopting the configuration in which when the lower limit value of the pump delivery pressure is larger than the control pressure of the regulator, the fuel pressure is made to constitute the control pressure of the regulator, the necessity of the pump delivery pressure sensor is obviated, whereby the number of components involved and production costs can be attempted to be reduced by such an extent.

In addition, according to the control device for a four-stroke engine of the sixth aspect of the invention, since an atmospheric pressure is detected from the detected intake pressure, there is no need to provide an atmospheric pressure sensor separately, whereby the number of components involved and production costs can be attempted to be reduced by such an extent.

Additionally, according to the control device for a four-stroke engine of the seventh aspect of the invention, since at least an intake pressure resulting immediately before the intake valve opens is detected, atmospheric pressures can be detected in real time and accurately by calculating the intake pressure resulting immediately before the intake valve opens as an atmospheric pressure.

In addition, according to the control method for a four-stroke engine of the eighth aspect of the invention, since the fuel injection device is controlled based on at least either of the atmospheric pressure and the fuel pressure, and the intake pressure, the injection fuel pressure required to control the fuel injection amount by the fuel injection time can be detected accurately and easily. In addition, since intake pressures are detected a plurality of times while the four-stroke engine completes its four strokes of intake, compression, expansion and exhaust strokes, a change in intake pressure resulting every time the strokes change can be detected so as to detect a transition, whereby fuel can be injected according to the transition so detected. Moreover, since a fuel injection time is calculated based on at least one of the plurality of intake pressure values so detected, whereby fuel is injected with an injection initiating timing according to the fuel injection time so calculated, an accurate fuel injection time can be set using an intake pressure detected at a timing which is optimum to calculate the fuel injection time, and as a result, fuel can be injected with the optimum injection initiating timing so as to enhance the combustion efficiency.

What is claimed is:

1. A control device for a four-stroke engine having an intake valve between a combustion chamber and an intake port and having at least one intake control valve for one intake port of the combustion chamber, the control device comprising a pump for pressurizing a fuel in a fuel tank, a regulator opened to an atmospheric pressure for regulating an upper limit value for the fuel pressurized by the pump, a fuel injection device for injecting the fuel regulated an upper limit value thereof by the regulator into the intake port, intake pressure detecting unit for detecting an intake pressure between the intake control valve and the combustion chamber, at least either atmospheric pressure detecting unit for detecting an atmospheric pressure or pump delivery pressure detecting unit for detecting the pressure of the fuel pressurized by the pump, and fuel injection control unit for controlling the fuel injection device based on at least either of an atmospheric pressure detected by the atmospheric pressure detecting unit and a fuel pressure detected by the pump delivery pressure detecting unit and an intake pressure detected by the intake pressure detecting unit, wherein the intake pressure detecting unit detects an intake pressure a plurality of times while the four-stroke engine completes four strokes of intake stroke, compression stroke, expansion stroke and exhaust stoke, and the fuel injection control unit calculates a fuel injection time based on at least one of a plurality of intake pressure values detected by the intake pressure detecting unit so as to inject the fuel with an injection initiating timing according to the fuel injection time so calculated.

2. A control device for a four-stroke engine as set forth in claim 1, wherein the pump and the regulator are disposed with the fuel tank.

3. A control device for a four-stroke engine as set forth claim 1 or 2, wherein the intake pressure detecting unit detects the intake pressure at least when a fuel injection time calculated by the fuel injection control unit is over or is about to be over.

4. A control device for a four-stroke engine as set forth in claim 3, wherein only the pump delivery pressure detecting unit is provided.

5. A control device for a four-stroke engine as set forth in claim 3, wherein only the atmospheric pressure detecting unit is provided.

6. A control device for a four-stroke engine as set forth in claim 5, wherein the atmospheric pressure detecting unit detects an atmospheric pressure from intake pressure detected by the intake pressure detecting unit.

7. A control device for a four-stroke engine as set forth in claim 6, wherein the intake pressure detecting unit detects at least an intake pressure resulting immediately before the intake valve opens.

8. A method for controlling a four-stroke engine having an intake valve between a combustion chamber and an intake port and having at least one intake control valve for one intake port of the combustion chamber, the method comprising the steps of pressurizing a fuel in a fuel tank, regulating by a regulator opened to an atmospheric pressure an upper limit value for the fuel pressurized by the pump, injecting the fuel regulated an upper limit value thereof by the regulator into the intake port, detecting an intake pressure between the intake control valve and the combustion chamber, performing at least either the step of detecting an atmospheric pressure or the step of detecting the pressure of the fuel so pressurized, and controlling the fuel injection based on at least either an atmospheric pressure detected through the step of detecting an atmospheric pressure or a fuel pressure detected through the step of detecting a fuel pressure and an intake pressure detected through the step of detecting an intake pressure, wherein in the step of detecting an intake pressure, an intake pressure is detected a plurality of times while the four-stroke engine completes four strokes of intake stroke, compression stroke, expansion stroke and exhaust stoke, and in the step of controlling the fuel injection, a fuel injection time is calculated based on at least one of a plurality of intake pressure values detected through the step of detecting an intake pressure so that the fuel is injected with an injection initiating timing according to the fuel injection time so calculated.

* * * * *